(12) United States Patent
Blitz et al.

(10) Patent No.: US 6,178,182 B1
(45) Date of Patent: Jan. 23, 2001

(54) METHOD AND COMMUNICATION SYSTEM FOR THE TRANSMISSION OF COMPRESSED VOICE INFORMATION IN A COMMUNICATION NETWORK

(75) Inventors: Andre Blitz; Klaus Wille, both of Munich; Walter Rott, Germering, all of (DE)

(73) Assignee: Siemens Aktiengesellschaft, Munich (GE)

( * ) Notice: Under 35 U.S.C. 154(b), the term of this patent shall be extended for 0 days.

(21) Appl. No.: 08/919,808

(22) Filed: Aug. 29, 1997

(30) Foreign Application Priority Data

Aug. 29, 1996 (DE) ............................... 196 35 025
Jul. 18, 1997 (DE) ............................... 196 30 986

(51) Int. Cl.[7] ........................... H04L 12/28; H04L 12/50; H04J 3/16; H04J 3/22
(52) U.S. Cl. ..................... 370/477; 370/351; 370/357; 370/359; 370/468
(58) Field of Search ................................... 370/351, 357, 370/359, 360, 375, 419, 420, 477, 468; 379/94, 58, 59, 63

(56) References Cited

U.S. PATENT DOCUMENTS

| 4,813,040 | * | 3/1989 | Futato ..................... 370/111 |
|---|---|---|---|
| 5,018,136 | * | 5/1991 | Gollub ..................... 370/60.1 |
| 5,617,467 | * | 4/1997 | Bacher et al. ..................... 379/58 |
| 5,632,017 | * | 5/1997 | Klein et al. ..................... 395/200 |
| 5,682,386 | * | 10/1997 | Arimilli et al. ..................... 370/468 |
| 5,757,781 | * | 5/1998 | Gilman et al. ..................... 370/260 |
| 5,854,789 | * | 12/1998 | Lesch et al. ..................... 370/395 |

FOREIGN PATENT DOCUMENTS

| 42 28 583 A1 | 11/1993 | (DE) . |
| 44 09 128 C1 | 1/1995 | (DE) . |
| 44 23 792 A1 | 1/1996 | (DE) . |
| 44 37 378 A1 | 5/1996 | (DE) . |

\* cited by examiner

Primary Examiner—Huy D. Vo
Assistant Examiner—M. Phan
(74) Attorney, Agent, or Firm—Schiff Hardin & Waite

(57) ABSTRACT

Given a transmission of digitized voice information (spi) compressed in originating communication systems (KS (S)) via a plurality of communication systems (KS) of a communication network (KN), the compressed voice information (spi') is matched to the switching bit rate of the transit communication systems (KS (T)) in the systems and are switched compressed. By avoiding the decompression and repeated compression of compressed voice information (spi'), delay times and distortions of the voice information (spi) are reduced.

10 Claims, 1 Drawing Sheet

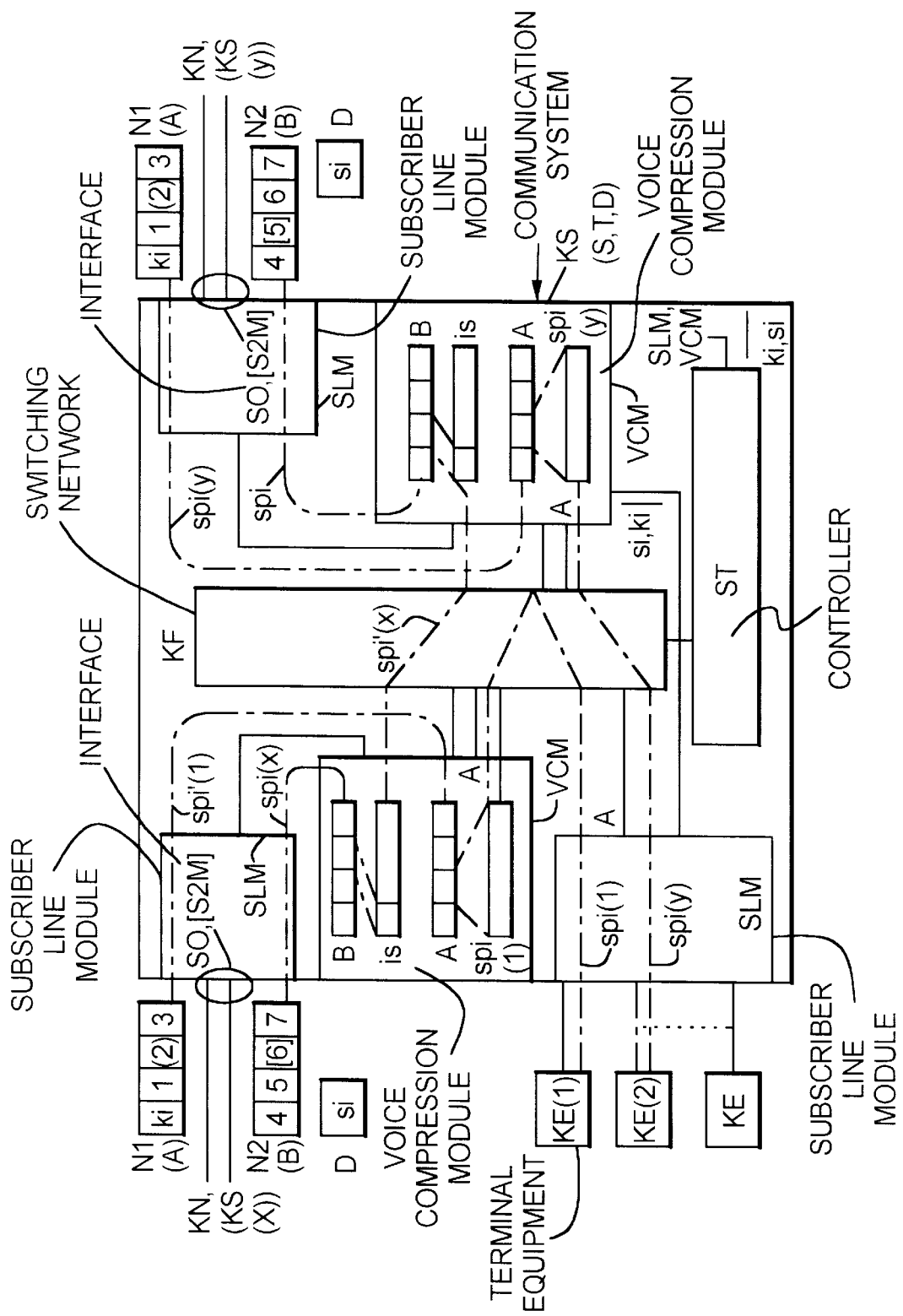

METHOD AND COMMUNICATION SYSTEM FOR THE TRANSMISSION OF COMPRESSED VOICE INFORMATION IN A COMMUNICATION NETWORK

BACKGROUND OF THE INVENTION

Communication networks for switching and transmitting digitized voice information are usually formed by a plurality of communication systems partially connected to, or respectively meshed with one another and to which communication terminal equipment is connected. The call setup and the call control ensues with signaling information. The digitized voice information is communicated between the communication systems in message channels and the signaling information is communicated in a signaling channel of a multiplexed message stream. The digitized voice information usually exhibits a bit rate of 64 or 56 Kbit/s and the multiplexed message stream exhibits bit rates of n×64 Kbit/s (for example, 2048 Kbit/s), whereby the message streams between the communication systems are transmitted over non-switched transmission paths.

In order to more efficiently use the transmission paths and the transmission equipment arranged between the communication systems, compression devices allocated to the transmission equipment and are used to compress the digitized voice information (for example, to form a compressed voice information with 16 Kbit/s and then multiplexed to form a message stream of, for example, 2048 Kbit/s). The multiplexed message stream is demultiplexed and the compressed voice information is decompressed at a communication system receiving such a message stream. Given a connection to a destination communication terminal equipment of this destination communication system as may be set up by the signaling information, the decompressed voice information is further communicated to the respective destination communication terminal equipment.

German Published Application DE 44 23 792 A1, for example, discloses a circuit arrangement for multiple utilization of basic channels in ISDN. The total data bit rate of 64 Kbit/s, available in a basic channel of an ISDN connection for data transmission, is divided time-offset with a suitable converter onto a plurality of data-reduced or, respectively, compressed, voice-coded, multiplexed speech channels having a lower bit rate.

When the respective communication system, according to the connection that has been setup, represents a transit communication system, then the respective, decompressed voice information is switched connection-conforming and is subsequently compressed again, inserted into a message stream or, respectively, multiplexed and communicated to the further communication system in conformity with the connection. The decompressing and compressing in the transit communication system causes time delays and distortions of the voice information that lead to a deterioration in the quality of the communicated, digitized voice information.

SUMMARY OF THE INVENTION

It is an object of the present invention to reduce the quality losses in the transmission of compressed voice information.

An important aspect of the inventive method is that a voice information compressed in an originating communication system that is to be transmitted via a plurality of communication systems, is not switched decompressed but compressed in the transit communication systems. As a result thereof, an additional time delay and a distortion of the communicated voice information is entirely avoided. In addition, the decompression and compression means can be at least partially foregone. Multiplexed devices that can be advantageously and economically realized are provided for the matching of the compressed voice information to the switching bit rate.

According to an advantageous embodiment of the present invention, compression information, indicating the compression, is communicated between the communication systems together with at least one compressed voice information. Advantageously, the compression information for at least two compressed voice information are communicated in one message channel of the message stream. Thus, given compressed voice information with 16 Kbit/s via 2×64 Kbit/s message streams (for example via an ISDN connection between two communication systems), compressed voice information are transmitted over seven message channels and the compression information for the seven message channels provided for the communication of compressed voice information are transmitted in the eighth message channel. During the call setup, the remote communication system is respectively informed by a communicated compression information as to whether and in what message channel a compressed voice information is being communicated.

Advantageously, the compressed voice information and compression information are multiplexed to form message streams of 56 or, respectively, 64 Kbit/s or m×56 or, respectively, 64 Kbit/s. The message streams are conducted over non-switched, individual 64 Kbit/s connections or over a non-switched ISDN—SO connection (2×64 Kbit/s) or an ISDN—S2 primary connection (32×64 Kbit/s).

The compression of the digitized voice information with 56 or 64 Kbit/s advantageously ensues in $2^n$ steps (n=2, 4, 8, 16). Referred to message channels with 64 Kbit/s, a compression of the voice information with 16 Kbit/s according to the standardized compression method according to G.728 is especially advantageous since the voice quality remains very high given a considerable savings of transmission paths and transmission equipment resources. The compressed voice information, advantageously 16 Kbit/s, is inserted into an information stream with the switching bit rate of 64 Kbit/s for the switching in a transit communication system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in which:

The single FIGURE is a block diagram of a communication system with connected communication terminals.

DESCRIPTION OF THE PREFERRED EMBODIMENTS

The block circuit diagram shows a communication system KS to which communication terminal KE are connected. The communication terminal equipment KE as well as the communication system KS represent components of a communication network KN, which may be for example an ISDN communication network KN. In the exemplary embodiment, the illustrated communication system KS is connected via two SO interfaces S0 to a respectively further communication system (not shown) of the communication network KN. In practice, further connections (not shown) to further communication systems of the communication network KN are provided to effect the at least partial meshing of the communication systems KS with other systems. Alternatively, given a higher traffic volume, ISDN primary interfaces S2M in addition to or in place of S0 interfaces are provided between the communication systems KS and the communication network KN. The inventive method is explained according to the block circuit diagram with its respective interfaces. The S0 interfaces S0 to other communication systems KS (x y) (not shown) of the communication network KN and to the depicted and other communication terminal equipment KE are realized by subscriber line modules SLM in the communication system KS. The subscriber line modules SLM shown in the block circuit diagram are realized, for example, by a single or, alternatively, by a plurality of subscriber line modules SLM with a plurality of S0 interfaces S0. A S0 interface S0 has two message channels N1, N2, as well as a signaling channel D. The signaling channel may be used for transmission of the call control via which signaling information si for setup and cleardown of a connection as well as for call control is communicated during a connection that has been setup. The message streams A, B communicated via the message channels N1, N2 exhibit a bit rate of 64 Kbit/s and the signaling channel D exhibits a bit rate of 16 Kbit/s.

Let it be assumed for the exemplary embodiment that only compressed voice information spi' is communicated over the two message channels N1, N2. This means that the outputs of the two subscriber line modules SLM, realizing the S0 interface S0 to further communication systems KS (x, y) are respectively conducted onto an input E of a voice compression module VCM. Outputs A of the two, illustrated voice compression modules VCM, as well as outputs A of the subscriber line module SLM connected to the communication terminal equipment KE are connected to a switching network KF, with whose assistance communication relationships are switched between the connected communication terminal equipment KE of the communication system KS and further communication systems KS (x, y) of the communication network KN. The setting of the switching network KF is effected by the controller ST on the basis of the communicated signaling information si. The controller ST is connected both to the switching network KF as well as to all other components SLM, VCM of the communication system KS. Since the voice information spi in the ISDN communication networks KN are usually switched and communicated digitized with a bit rate of 64 Kbit/s, the switching network KF is matched to a switching bit rate of 64 Kbit/s. This means that only connections having a bit rate of 64 Kbit/s can be switched via the switching network KF.

Let it be assumed for the exemplary embodiment that, given communication relationships within a communication system KS, digitized voice information spi communicated from communication terminal equipment KE are switched uncompressed and transmitted to the destination communication terminal equipment KE. Given communication relationships that are to be switched or, respectively, communicated at least to a further communication system KS (x, y), a compression of the voice information spi is provided. Advantageously, this compression ensues according to the standardized compression method G.728. According to this compression method, the voice information spi is compressed into compressed voice information spi' having a bit rate of 16 Kbit/s given an advantageous delay time of 1–2 msec. This standardized compression method offers a high voice quality and, due to the slight delay times, requires no additional echo compensation. With reference to the exemplary embodiment, the digitized voice information spi (1) communicated from the first communication terminal equipment KE (1) is switched over the switching network KF according to the signaling information si communicated in the call setup and is forwarded to the voice compression module VCM. In this, the voice information spi (1) is compressed into compressed voice information spi' (1) according to the compression method G.728 and is inserted, that is multiplexed, into the second message stream B with a bit rate of 64 Kbit/s. Let it also be assumed, for the exemplary embodiment, that the compressed voice information spi' (1) is inserted into the third sub-message channel of the first message channel N1 (indicated by the designation (2)). Note the schematic illustration of the message channels N1, N2 at the leads of S0 interface S0 in the block circuit diagram. It can additionally be seen from this illustration that compression information ki is entered into the first sub-message channel. This compression information ki indicates the further sub-message channels 1–7 in which a compressed voice information spi' is being currently transmitted. Given a flexibility, that is dynamic division into sub-channels (not shown), compressed voice information spi' can be communicated with different bit rates. However, information indicating both the position as well as the bit rate of the respective, compressed voice information spi' is to be specified in the compression information ki. The multiplexed message stream A having a bit rate 64 Kbit/s is communicated to the allocated subscriber line module SLM and is adapted therein to the transmission-oriented conditions of the transmission link (not shown). Subsequently, the message stream A is forwarded via the S0 interface S0 to the effected communication system KS (x) of the communication network KN.

Let it also be assumed in the exemplary embodiment that a compressed voice information spi'(y) is received via a further communication system KS (y) in the first message stream A, in the third message channel (2) thereof, and is communicated to the voice compression module VCM together with the received compression information ki. Using the voice compression module VCM, the compressed voice information spi'(y) is taken from the message stream A, i.e. demultiplexed, and is decompressed to form a digitized voice information spi(y). This is switched or, respectively, communicated via the switching network KF to a second communication terminal equipment KE(2) defined by the call setup, being switched or, respectively, communicated according to the connection setup with the controller ST. The above-explained method is provided in a communication system KS that represents a destination communication system KS (D) for the respectively set-up connection.

When the illustrated communication system KS presents a transit communication system KS(T), then the compressed voice information spi'(x) communicated, for example, from the communication system KS(x) of the communication network KN in the seventh sub-message channel (6) of the second message channel N2 transmitted to the voice compression module VCM. Therein, the compressed voice information spi'(x) is not decompressed, but is inserted into an information stream having a bit rate of 64 Kbit/s. This removal and insertion is realized with known multiplex technology. This information stream is matched to the switching bit rate of the switching network KF and can now be switched via the switching network and in turn supplied to the voice compression module VCM. In the latter, the compressed voice information spi'(x) is again taken from the information stream and inserted into a sixth sub-message channel (5) of the second message channel N2. This removal and insertion can again be realized with known multiplex technology. Important concepts to the present invention are the matching of the compressed voice information spi' to the switching bit rate of the switching network and the switching of the matched, compressed voice information spi' via the switching network. This matching is effected by simple multiplexing of the compressed voice information spi' (with a bit rate of 16 Kbit/s in the exemplary embodiment) and can be simply realized by using known multiplex technology (commercially available circuit technology). The switching-oriented settings of the switching network KF, given an established connection wherein the illustrated communication system KS represents a transit communication system KS (T), are effected by the communicated signaling information si during the call setup.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for connection-oriented transmission of message streams having compressed, digitized voice information in a communication network having a plurality of at least partially meshed communication systems, comprising the steps of:
   at least temporarily establishing connections via the communication systems using signaling information;
   taking compressed, digital voice information from a message stream arriving in a respective communication system;
   communicating the digital voice information in a communicated compressed connection-conforming manner in the respective communication system;
   inserting a further message stream when the respective communication system is a transit communication system with respect to the compressed, digital voice information;
   digitized voice information with a bit rate of 64 Kbit/s being compressed using a compression routine to form voice information with bit rates of 64 Kbit/s/n, where n=2, 4, 8, 16, whereby the compression routing according to ITU standard G.728 is realized given a compression to 16 Kbit/s.

2. A method for connection-oriented transmission of message streams having compressed, digitized voice information in a communication network having a plurality of at least partially meshed communication systems, comprising the steps of:
   at least temporarily establishing connections via the communication systems using signaling information;
   taking compressed, digital voice information from a message stream arriving in a respective communication system;
   communicating the digital voice information in a communicated compressed connection-conforming manner in the respective communication system;
   inserting a further message stream when the respective communication system is a transit communication system with respect to the compressed, digital voice information;
   compressed digital voice information having a bit rate of 64 Kbit/s/n, wherein n=2, 4, 8, 16, being inserted into an information stream with a switching bit rate of 64 Kbit/s for switching in a transit communication system.

3. A method for connection-oriented transmission of message streams having compressed, digitized voice information in a communication network having a plurality of at least partially meshed communication systems, comprising the steps of:
   at least temporarily establishing connections via the communication systems using signaling information;
   taking compressed, digital voice information from a message stream arriving in a respective communication system;
   communicating the digital voice information in a communicated compressed connection-conforming manner in the respective communication system;
   inserting a further message stream when the respective communication system is a transit communication system with respect to the compressed, digital voice information;
   compression information indicating the compression of at least one digital voice information being communicated between the communication systems;
   a plurality of compressed digital voice information as well as the compression information being multiplexed or, respectively, demultiplexed to form a message stream having a transmission rate of 56 Kbit/s or, respectively, 64 Kbit/s.

4. A method for connection-oriented transmission of message streams having compressed, digitized voice information in a communication network having a plurality of at least partially meshed communication systems, comprising the steps of:
   at least temporarily establishing connections via the communication systems using signaling information;
   taking compressed, digital voice information from a message stream arriving in a respective communication system;
   communicating the digital voice information in a communicated compressed connection-conforming manner in the respective communication system;
   inserting a further message stream when the respective communication system is a transit communication system with respect to the compressed, digital voice information;
   compression information indicating the compression of at least one digital voice information being communicated between the communication systems;
   a plurality of compressed digital voice information as well as the compression information being multiplexed or, respectively, demultiplexed to form a message stream of m×56 Kbit/s or, respectively, 64 Kbit/s.

5. A method for connection-oriented transmission of message streams having compressed, digitized voice information in a communication network having a plurality of at least partially meshed communication systems, comprising the steps of:
   at least temporarily establishing connections via the communication systems using signaling information;
   communicating compression information indicating the compression of the digital voice information to the respective communication system;
   matching the compressed digital voice information taken from the message stream to a switching bit rate of the communication system;

taking compressed, digital voice information from a message stream arriving in a respective communication system;

communicating the digital voice information in a communicated compressed connection-conforming manner in the respective communication system;

inserting a further message stream when the respective communication system is a transit communication system with respect to the compressed, digital voice information.

6. The method according to claim 5, wherein compression information for at least two compressed voice information is communicated in a sub-message channel of the message stream.

7. The method according to claim 5, wherein digitized voice information with a bit rate of 64 Kbit/s is compressed using a compression routine to form voice information with bit rates of 64 Kbit/s/n, where n=2, 4, 8, 16, whereby the compression routing according to ITU standard G.728 is realized given a compression to 16 Kbit/s.

8. The method according to claim 5, wherein compressed digital voice information having a bit rate of 64 Kbit/s/n, wherein n=2, 4, 8, 16, is inserted into an information stream with a switching bit rate of 64 Kbit/s for switching in a transit communication system.

9. The method according to claim 5, wherein a plurality of compressed digital voice information as well as the compression information are multiplexed or, respectively, demultiplexed to form a message stream having a transmission rate of 56 Kbits/s or, respectively, 64 Kbit/s.

10. The method according to claim 5, wherein a plurality of compressed digital voice information as well as the compression information are multiplexed or, respectively, demultiplexed to form a message stream of m×56 Kbits/s or, respectively, 64 Kbit/s.

* * * * *